United States Patent
Hillier, III et al.

(10) Patent No.: US 8,340,112 B2
(45) Date of Patent: Dec. 25, 2012

(54) IMPLEMENTING ENHANCED LINK BANDWIDTH IN A HEADLESS INTERCONNECT CHIP

(75) Inventors: Phillip Rogers Hillier, III, Rochester, MN (US); David Alan Shedivy, Rochester, MN (US); Kenneth Michael Valk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 12/731,715

(22) Filed: Mar. 25, 2010

(65) Prior Publication Data

US 2011/0235652 A1    Sep. 29, 2011

(51) Int. Cl.
*H04L 12/54* (2006.01)
(52) U.S. Cl. .................... 370/428; 709/239
(58) Field of Classification Search ........... 370/230, 370/231, 235, 238, 428, 429, 398.42; 709/238, 709/239
See application file for complete search history.

(56) References Cited

U.S. PATENT DOCUMENTS

| | | | |
|---|---|---|---|
| 5,490,007 A | 2/1996 | Bennett et al. | |
| 6,094,434 A | 7/2000 | Kotzur et al. | |
| 6,308,228 B1 | 10/2001 | Yocum et al. | |
| 6,671,275 B1 * | 12/2003 | Wong et al. | 370/389 |
| 7,023,807 B2 * | 4/2006 | Michels et al. | 370/238 |
| 2002/0085553 A1 * | 7/2002 | Ku et al. | 370/389 |
| 2002/0085565 A1 * | 7/2002 | Ku et al. | 370/395.42 |
| 2002/0118640 A1 * | 8/2002 | Oberman et al. | 370/230 |
| 2005/0063301 A1 | 3/2005 | Glaise et al. | |
| 2005/0128949 A1 | 6/2005 | Ku et al. | |
| 2007/0143522 A1 | 6/2007 | Wilkinson et al. | |
| 2008/0042693 A1 * | 2/2008 | Bucossi et al. | 327/65 |

OTHER PUBLICATIONS

International Search Report and Written Opinion of the International Searching Authority for (PCT/EP2011/053706) dated Aug. 26, 2011.

* cited by examiner

*Primary Examiner* — Hassan Phillips
*Assistant Examiner* — Ajay Cattungal
(74) *Attorney, Agent, or Firm* — Joan Pennington

(57) ABSTRACT

A method and circuit for implementing enhanced link bandwidth for a headless interconnect chip in a local rack interconnect system, and a design structure on which the subject circuit resides are provided. The headless interconnect chip includes a cut through switch and a store and forward switch. A packet is received from an incoming link to be transmitted on an outgoing link on the headless interconnect chip. Both the cut through switch and the store and forward switch are selectively used for moving packets received from the incoming link to the outgoing link on the headless interconnect chip.

22 Claims, 9 Drawing Sheets

IMPLEMENTING ENHANCED LINK BANDWIDTH IN A HEADLESS INTERCONNECT CHIP

FIELD OF THE INVENTION

The present invention relates generally to the data processing field, and more particularly, relates to a method and circuit for implementing enhanced link bandwidth for a headless interconnect chip in a local rack interconnect system, and a design structure on which the subject circuit resides.

DESCRIPTION OF THE RELATED ART

A local rack interconnect system is used to transfer packets from a source high bandwidth device, such as either a central processor unit (CPU) or an input/output (I/O) adapter, to a destination high bandwidth device, for example, either a CPU or I/O adapter, using one or more hops across lower bandwidth links in the interconnect system. The local rack interconnect system includes a source interconnect chip connected to the source high bandwidth device, such as either a central processor unit (CPU) or an input/output (I/O) adapter, and a destination interconnect chip connected to the destination high bandwidth device, for example, either a CPU or I/O adapter. The local rack interconnect system must be able to sustain the high bandwidth of the source and destination devices while maintaining low latency in transferring packets from the source device to the destination device.

As used in the following description and claims, a headless interconnect chip in a local rack interconnect system should be understood to include an interconnect chip without a connected high bandwidth source or a connected high bandwidth destination device. The headless interconnect chip in the local rack interconnect system is an intermediate interconnect chip and is not connected to either a central processor unit (CPU) or an input/output (I/O) adapter.

A need exists for an effective method and circuit to implement enhanced link bandwidth for a headless interconnect chip in a local rack interconnect system.

SUMMARY OF THE INVENTION

Principal aspects of the present invention are to provide a method and circuit for implementing enhanced link bandwidth for a headless interconnect chip in an interconnect system, and a design structure on which the subject circuit resides. Other important aspects of the present invention are to provide such method, circuitry, and design structure substantially without negative effect and that overcome many of the disadvantages of prior art arrangements.

In brief, a method and circuit for implementing enhanced link bandwidth for a headless interconnect chip in an interconnect system, and a design structure on which the subject circuit resides are provided. The headless interconnect chip includes a cut through switch and a store and forward switch. A packet is received from an incoming link to be transmitted on an outgoing link on the headless interconnect chip. Both the cut through switch and the store and forward switch are selectively used for moving packets received from the incoming link to the outgoing link on the headless interconnect chip.

In accordance with features of the invention, when a packet is received on an incoming link, a decision is made whether the packet should be sent to the cut through switch or to the store and forward switch. This decision is based upon a selected one of two modes.

In accordance with features of the invention, the first mode sends the packet to the store and forward switch when an input buffer in the cut through switch is above a programmable threshold. The second mode sends a selected percentage of the incoming link packets or a first number X out of a second number Y of incoming packets to the store and forward switch.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, circuits and methods are provided for implementing enhanced link bandwidth for a headless interconnect chip in a multiple-path local rack interconnect system.

Figure 1A:
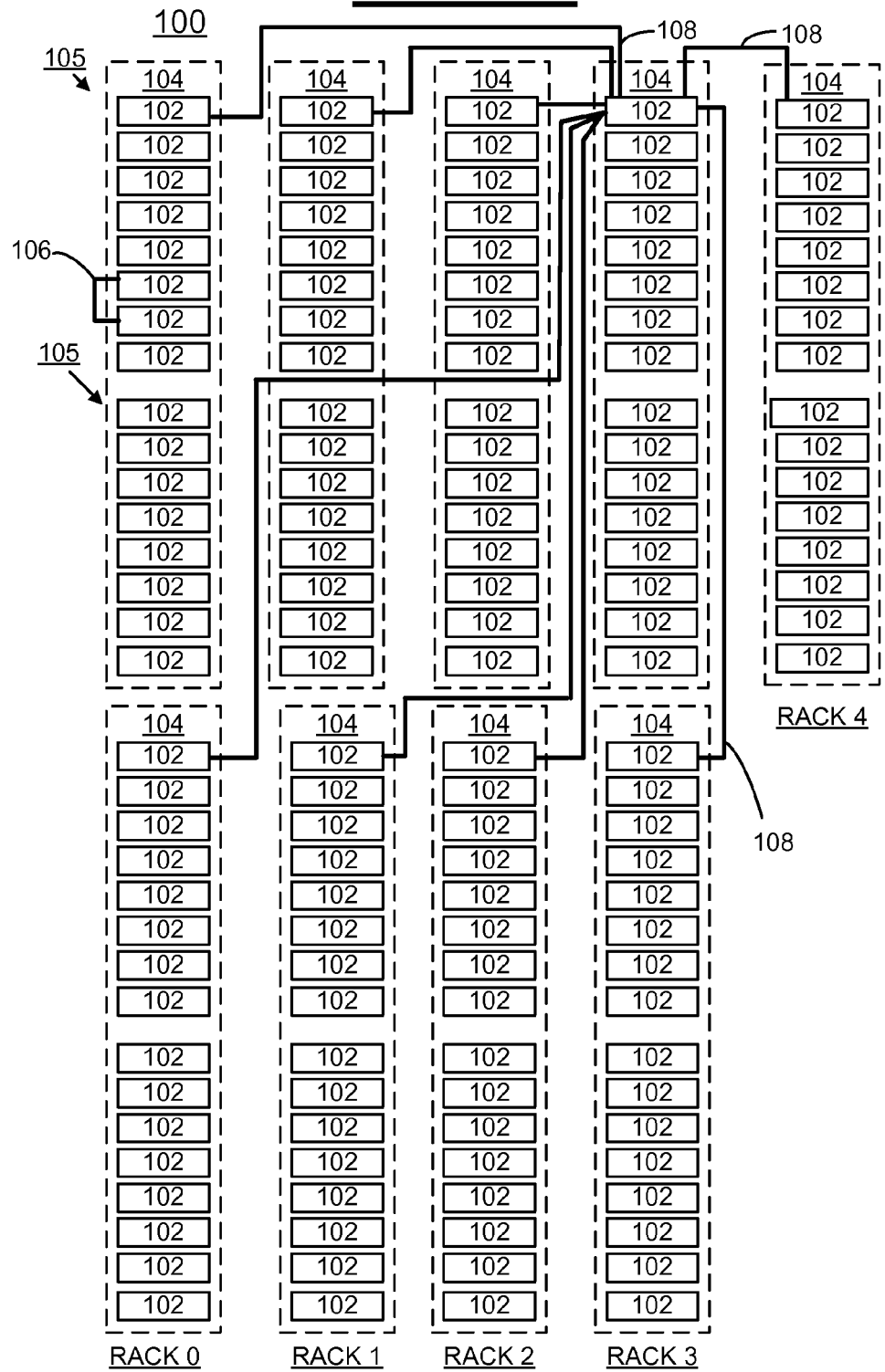
FIGS. 1A, 1B, 1C, 1D, and 1E are respective schematic and block diagrams illustrating an exemplary a local rack interconnect system for implementing enhanced link bandwidth for a headless interconnect chip in accordance with the preferred embodiment.

Having reference now to the drawings, in FIG. 1A, there is shown an example multiple-path local rack interconnect system generally designated by the reference character 100 used for implementing enhanced link bandwidth for a headless interconnect chip in accordance with the preferred embodiment. The multiple-path local rack interconnect system 100 supports computer system communications between multiple servers, and enables an Input/Output (IO) adapter to be shared across multiple servers. The multiple-path local rack interconnect system 100 supports network, storage, clustering and Peripheral Component Interconnect Express (PCIe) data traffic.

The multiple-path local rack interconnect system 100 includes a plurality of interconnect chips 102 in accordance with the preferred embodiment arranged in groups or super nodes 104. Each super node 104 includes a predefined number of interconnect chips 102, such as 16 interconnect chips, arranged as a chassis pair including a first and a second chassis group 105, each including 8 interconnect chips 102. The multiple-path local rack interconnect system 100 includes, for example, a predefined maximum number of nine super nodes 104. As shown, a pair of super nodes 104 are provided within four racks or racks 0-3, and a ninth super node 104 is provided within the fifth rack or rack 4.

In FIG. 1A, the multiple-path local rack interconnect system 100 is shown in simplified form sufficient for understanding the invention, with one of a plurality of local links (L-links) 106 shown between a pair of the interconnect chips 102 within one super node 104. The multiple-path local rack interconnect system 100 includes a plurality of L-links 106 connecting together all of the interconnect chips 102 of each super node 104. A plurality of distance links (D-links) 108, or as shown eight D-links 108 connect together the example nine super nodes 104 together in the same position in each of the other chassis pairs. Each of the L-links 106 and D-links 108 comprises a bi-directional (x2) high-speed serial (HSS) link.

Figure 1B:
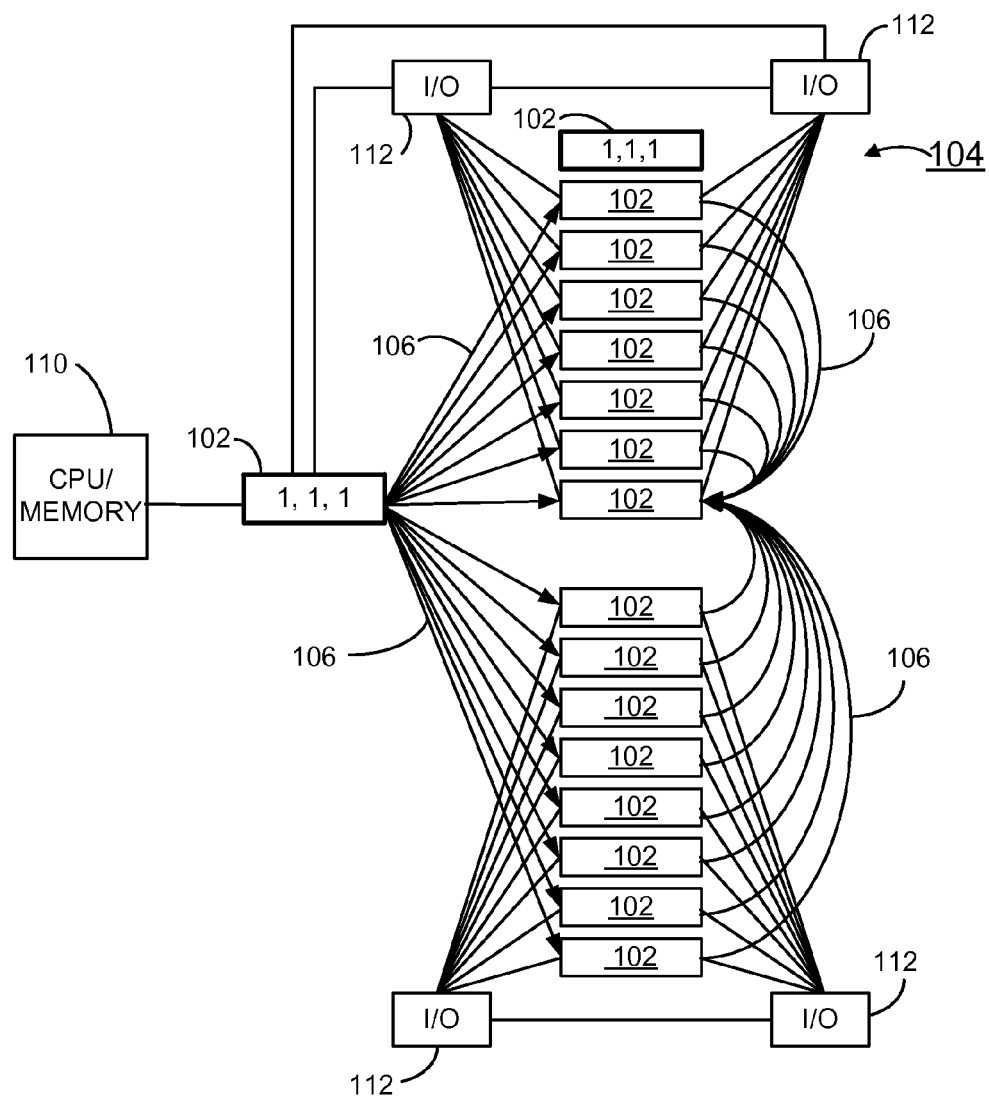
Figure 1C:
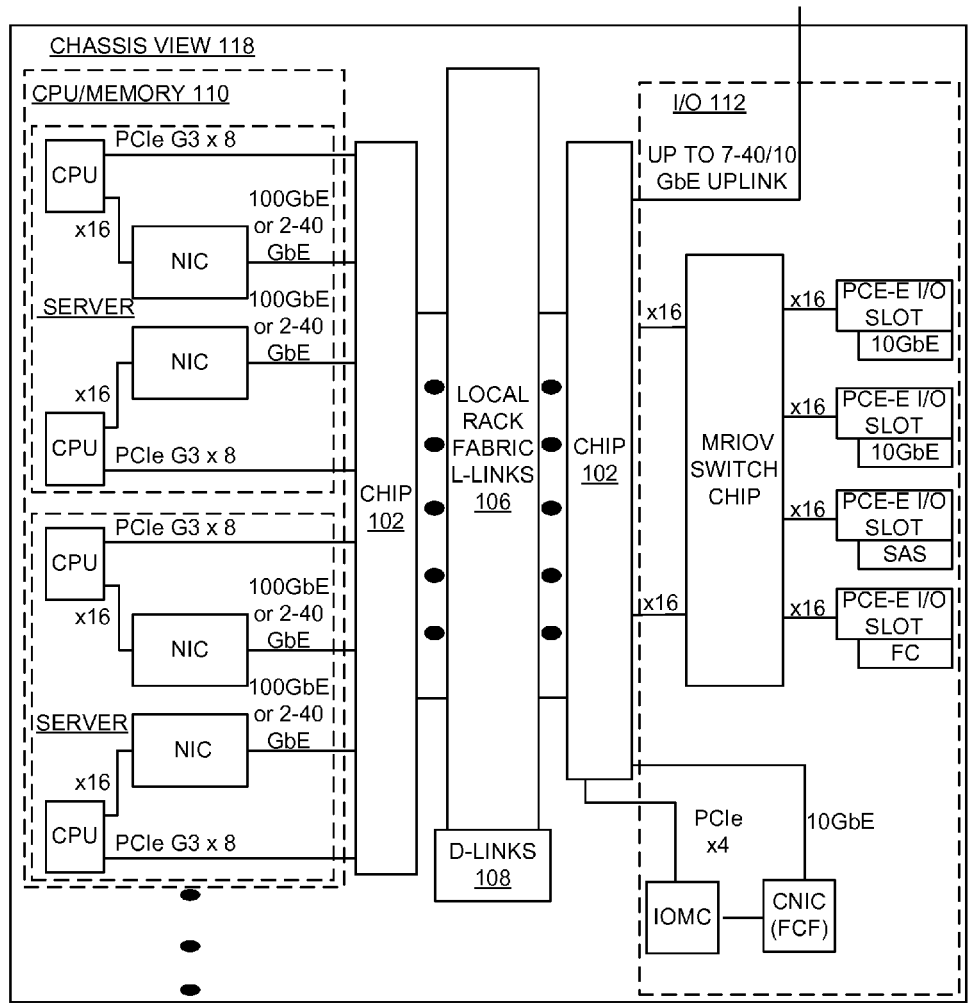
Figure 1D:
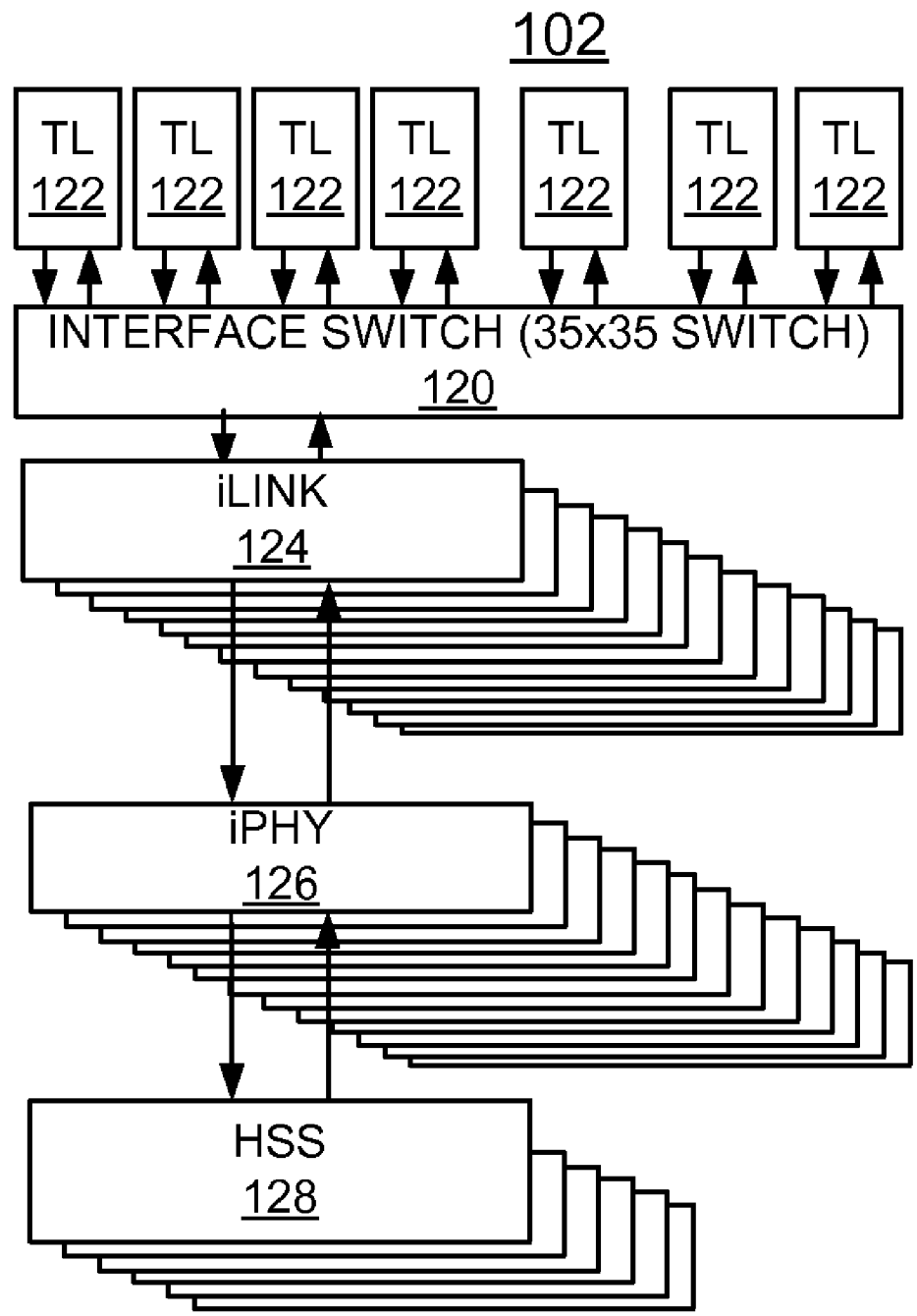
Figure 1E:
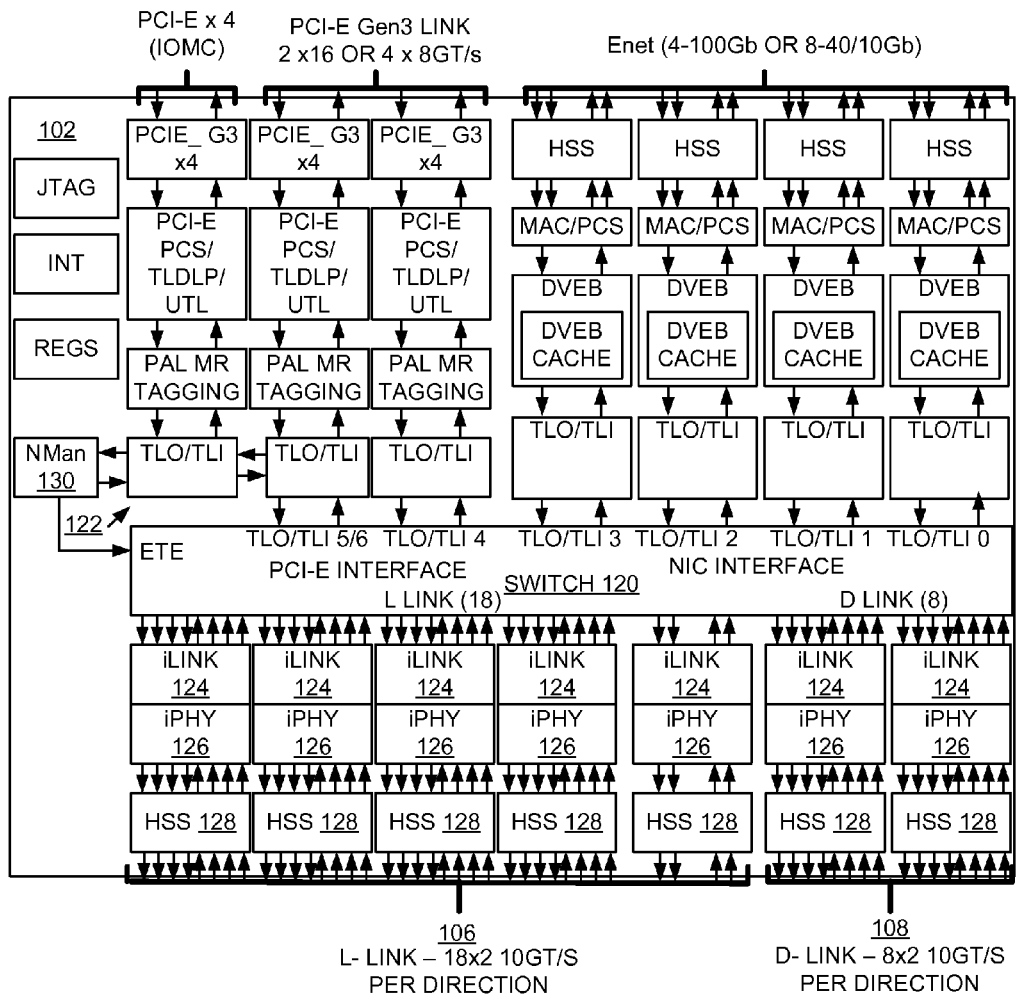

Referring also to FIG. 1E, each of the interconnect chips 102 of FIG. 1A includes, for example, 18 L-links 106, labeled 18 x2 10 GT/S PER DIRECTION and 8 D-links 108, labeled 8 x2 10 GT/S PER DIRECTION.

Referring also to FIGS. 1B and 1C, multiple interconnect chips 102 defining a super node 104 are shown connected together in FIG. 1B. A first or top of stack interconnect chip 102, labeled 1,1,1 is shown twice in FIG. 1B, once off to the side and once on the top of the stack. Connections are shown to the illustrated interconnect chip 102, labeled 1,1,1 positioned on the side of the super node 104 including a plurality of L-links 106 and a connection to a device 110, such as a central processor unit (CPU)/memory 110. A plurality of D links 108 or eight D-links 108 as shown in FIG. 1A, (not shown in FIG. 1B) are connected to the interconnect chips 102, such as interconnect chip 102, labeled 1,1,1 in FIG. 1B.

As shown in FIG. 1B, each of a plurality of input/output (I/O) blocks 112, is connected to respective interconnect chips 102, and respective ones of the I/O 112 are connected together. A source interconnect chip 102, such as interconnect chip 102, labeled 1,1,1 transmits or sprays all data traffic across all L-links 106. A local I/O 112 may also use a particular L-link 106 of destination I/O 112. For a destination inside a super node 104, or chassis pair of first and second chassis group 105, a source interconnect chip or an intermediate interconnect chip 102 forwards packets directly to a destination interconnect chip 102 over an L-link 106. For a destination outside a super node 104, a source interconnect chip or an intermediate interconnect chip 102 forwards packets to an interconnect chip 102 in the same position on the destination super node 104 over a D-link 108. The interconnect chip 102 in the same position on the destination super node 104 forwards packets directly to a destination interconnect chip 102 over an L-link 106.

In the multiple-path local rack interconnect system 100, the possible routing paths with the source and destination interconnect chips 102 within the same super node 104 include a single L-link 106; or a pair of L-links 106. The possible routing paths with the source and destination interconnect chips 102 within different super nodes 104 include a single D-link 108 (D); or a single D-link 108, and a single L-link 106 (D-L); or a single L-link 106, and single D-link 108 (L-D); or a single L-link 106, a single D-link 108, and a single L-link 106 (L-D-L). With an unpopulated interconnect chip 102 or a failing path, either the L-link 106 or D-link 108 at the beginning of the path is removed from a spray list at the source interconnect 102.

As shown in FIGS. 1B and 1C, a direct path is provided from the central processor unit (CPU)/memory 110 to the interconnect chips 102, such as chip 102, labeled 1,1,1 in FIG. 1B, and from any other CPU/memory connected to another respective interconnect chip 102 within the super node 104.

Referring now to FIG. 1C, a chassis view generally designated by the reference character 118 is shown with a first of a pair of interconnect chips 102 connected a central processor unit (CPU)/memory 110 and the other interconnect chip 102 connected to input/output (I/O) 112 connected by local rack fabric L-links 106, and D-links 108. Example connections shown between each of an illustrated pair of servers within the CPU/memory 110 and the first interconnect chip 102 include a Peripheral Component Interconnect Express (PCIe) G3 x8, and a pair of 100 GbE or 2-40 GbE to a respective Network Interface Card (NIC). Example connections of the other interconnect chip 102 include up to 7-40/10 GbE Uplinks, and example connections shown to the I/O 112 include a pair of PCIe G3 x16 to an external MRIOV switch chip, with four x16 to PCI-E I/O Slots with two Ethernet slots indicated 10 GbE, and two storage slots indicated as SAS (serial attached SCSI) and FC (fibre channel), a PCIe x4 to a IOMC and 10 GbE to CNIC (FCF).

Referring now to FIGS. 1D and 1E, there are shown block diagram representations illustrating an example interconnect chip 102. The interconnect chip 102 includes an interface switch 120 connecting a plurality of transport layers (TL) 122, such as 7 TLs, and interface links (iLink) layer 124 or 26 iLinks. An interface physical layer protocol, or iPhy 126 is coupled between the interface links layer iLink 124 and high speed serial (HSS) interface 128, such as 7 HSS 128. As shown in FIG. 1E, the 7 HSS 128 are respectively connected to the illustrated 18 L-links 106, and 8 D-links 108. In the example implementation of interconnect chip 102, 26 connections including the illustrated 18 L-links 106, and 8 D-links 108 to the 7 HSS 128 are used, while the 7 HSS 128 would support 28 connections.

The TLs 122 provide reliable transport of packets, including recovering from broken chips 102 and broken links 106, 108 in the path between source and destination. For example, the interface switch 120 connects the 7 TLs 122 and the 26 iLinks 124 in a crossbar switch, providing receive buffering for iLink packets and minimal buffering for the local rack interconnect packets from the TLO 122. The packets from the TL 122 are sprayed onto multiple links by interface switch 120 to achieve higher bandwidth. The iLink layer protocol 124 handles link level flow control, error checking CRC generating and checking, and link level retransmission in the event of CRC errors. The iPhy layer protocol 126 handles training sequences, lane alignment, and scrambling and descrambling. The HSS 128, for example, are 7 x8 full duplex cores providing the illustrated 26 x2 lanes.

In FIG. 1E, a more detailed block diagram representation illustrating the example interconnect chip 102 is shown. Each of the 7 transport layers (TLs) 122 includes a transport layer out (TLO) partition and transport layer in (TLI) partition. The TLO/TLI 122 respectively receives and sends local rack interconnect packets from and to the illustrated Ethernet (Enet), and the Peripheral Component Interconnect Express (PCI-E), PCI-E x4, PCI-3 Gen3 Link respectively via network adapter or fabric adapter, as illustrated by blocks labeled high speed serial (HSS), media access control/physical coding sub-layer (MAC/PCS), distributed virtual Ethernet bridge (DVEB); and the PCIE_G3 x4, and PCIE_G3 2 x8, PCIE_G3 2 x8, a Peripheral Component Interconnect Express (PCIe) Physical Coding Sub-layer (PCS) Transaction Layer/Data/Link Protocol (TLDLP) Upper Transaction Layer (UTL), PCIe Application Layer (PAL MR) TAGGING to and from the interconnect switch 120. A network manager (NMan) 130 coupled to interface switch 120 uses End-to-End (ETE) small control packets for network management and control functions in multiple-path local rack interconnect system 100. The interconnect chip 102 includes JTAG, Interrupt Handler (INT), and Register partition (REGS) functions.

In accordance with features of the invention, a method and an enhanced link bandwidth circuit for implementing enhanced link bandwidth for a headless interconnect chip 102 in the multiple-path local rack interconnect system 100, and a design structure on which the subject circuit resides are provided. In the headless interconnect chip 102, a store and forward ISR_TL switch of the switch 120 is not used to transfer device traffic because there are no devices connected to a headless interconnect chip. The invention uses the store and forward ISR_TL switch of the switch 120 in a new mode for the headless interconnect chip 102. The store and forward ISR_TL switch of the switch 120 receives some percentage of the incoming link packets and does the switching to the outgoing link.

Figure 2:
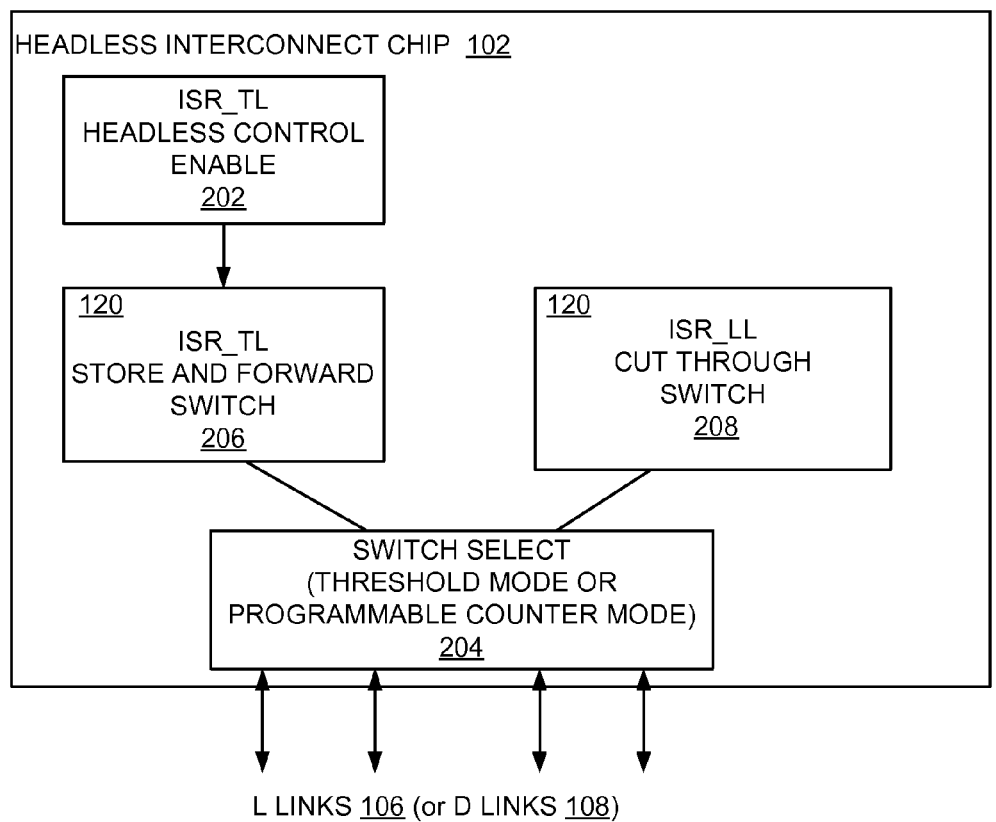
FIG. 2 is a schematic and block diagram illustrating a circuit for implementing enhanced link bandwidth for a headless interconnect chip in accordance with the preferred embodiment.

Referring now to FIG. 2, there is shown an enhanced link bandwidth circuit generally designated by the reference character 200 for implementing enhanced link bandwidth for a headless interconnect chip 102 in the multiple-path local rack interconnect system 100 in accordance with the preferred embodiment. The link bandwidth circuit 200 includes an ISR_TL headless control enable 202 enabling a store and forward ISR_TL switch 206 of the switch 120 to perform link-to-link switching to transfer some of the link-to-link packets that are received on the headless interconnect chip 102.

The link bandwidth circuit 200 includes a switch select logic 204 for selecting a ISR_LL cut through switch 208 of the switch 120 or the store and forward ISR_TL switch 206 of the switch 120 to perform the link-to-link switching of an incoming link packet on an L link 106 or a D link 108. The switch select 204 operates in a threshold mode or a programmable counter mode. In the threshold mode, the switch select 204 sends the packet to the store and forward ISR_TL switch 206 when the input buffer in the cut through switch is above a programmable threshold. In the second programmable counter mode, the switch select 204 sends a selected percentage of the incoming link packets or a first number X out of a second number Y of incoming packets to the store and forward ISR_TL switch 206.

The store and forward ISR_TL switch 206 in the interconnect chip 102 typically is connected to a source device or destination device, and handles moving each packet to and from a high bandwidth device interface from and to the low bandwidth link interface.

Figure 3:
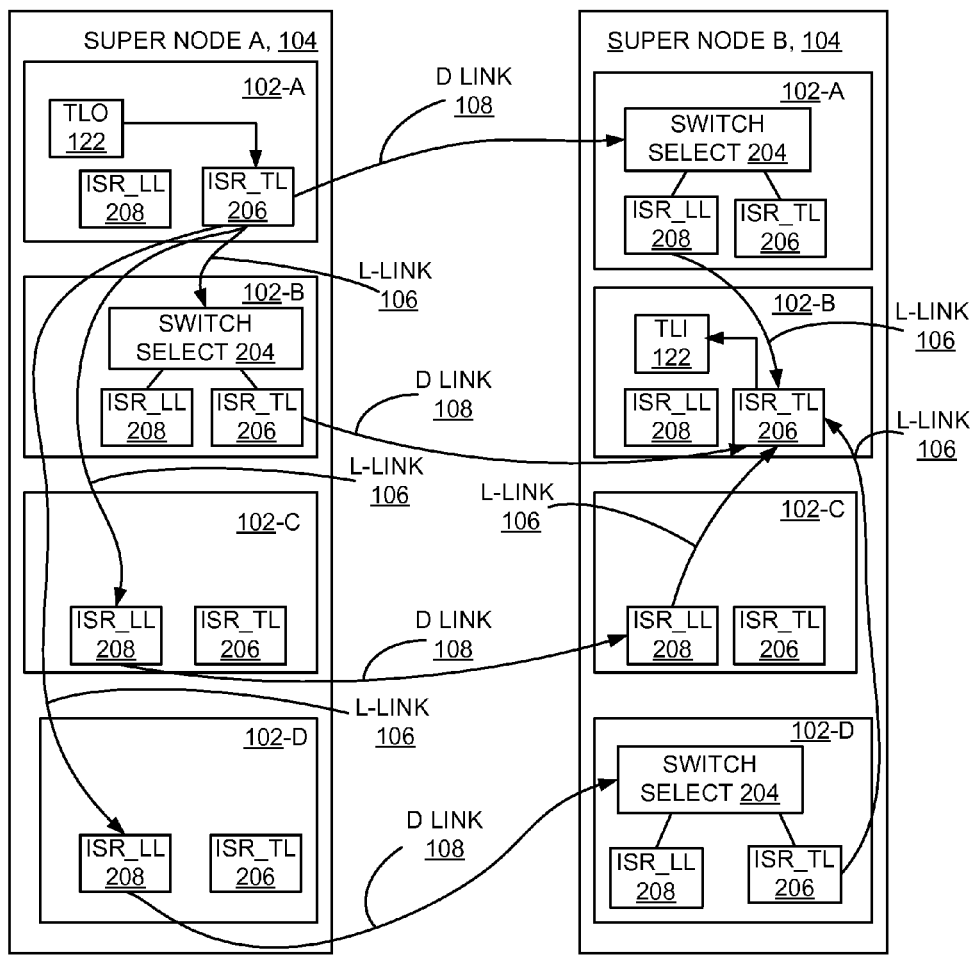
FIGS. 3, and 4 are charts illustrating exemplary operations performed by the circuit of FIG. 2 for implementing enhanced link bandwidth for a headless interconnect chip in accordance with the preferred embodiment.

Referring now to FIG. 3, there are shown exemplary operations generally designated by the reference character 300 performed by the circuit 200 for implementing enhanced link bandwidth for a headless interconnect chip 102 in the multiple-path local rack interconnect system 100 in accordance with the preferred embodiment. Packet transfer operations 300 illustrate multiple packet transfer paths including multiple D links 108 between respective interconnect chips 102, A, B, C, and D of a pair of super nodes A and B, 104 and over multiple L links 106 between respective interconnect chips 102, A, B, C, and D within the respective super nodes A and B, 104.

As illustrated in FIG. 3, the interconnect chip 102, B of super node A, 104 and interconnect chips 102, A, and D of super node B, 104 are headless interconnect chips 102 including the switch connect 204. The interconnect chip 102, A of super node A, 104 is the source interconnect chip 102. The interconnect chip 102, B of super node B, 104 is the destination interconnect chip 102.

In each of the headless interconnect chips 102, A of super node A, 104, and the headless interconnect chips 102, A, and D of super node B, 104, the switch connect 204 selects the ISR_LL cut through switch 208 or the store and forward ISR_TL switch 206 to perform the link-to-link switching of an incoming link packet on an L link 106 or a D link 108.

For example, as shown in the packet transfer operations 300, the switch select 204 of headless interconnect chip 102, B of super node A, 104 selects the store and forward ISR_TL switch 206 to transfer the packet to a D link 108. The switch select 204 of headless interconnect chip 102, A of super node B, 104 selects the cut through ISR_LL switch 208 to transfer the packet to an L link 106 and the switch select 204 of headless interconnect chip 102, D of super node B, 104 selects the store and forward ISR_TL switch 206 to transfer the packet to an L link 106. The store and forward ISR_TL switch 206 is used to handle some percentage of the link-to-link switching providing a maximum bandwidth on the outgoing links at an acceptable value.

Figure 4:
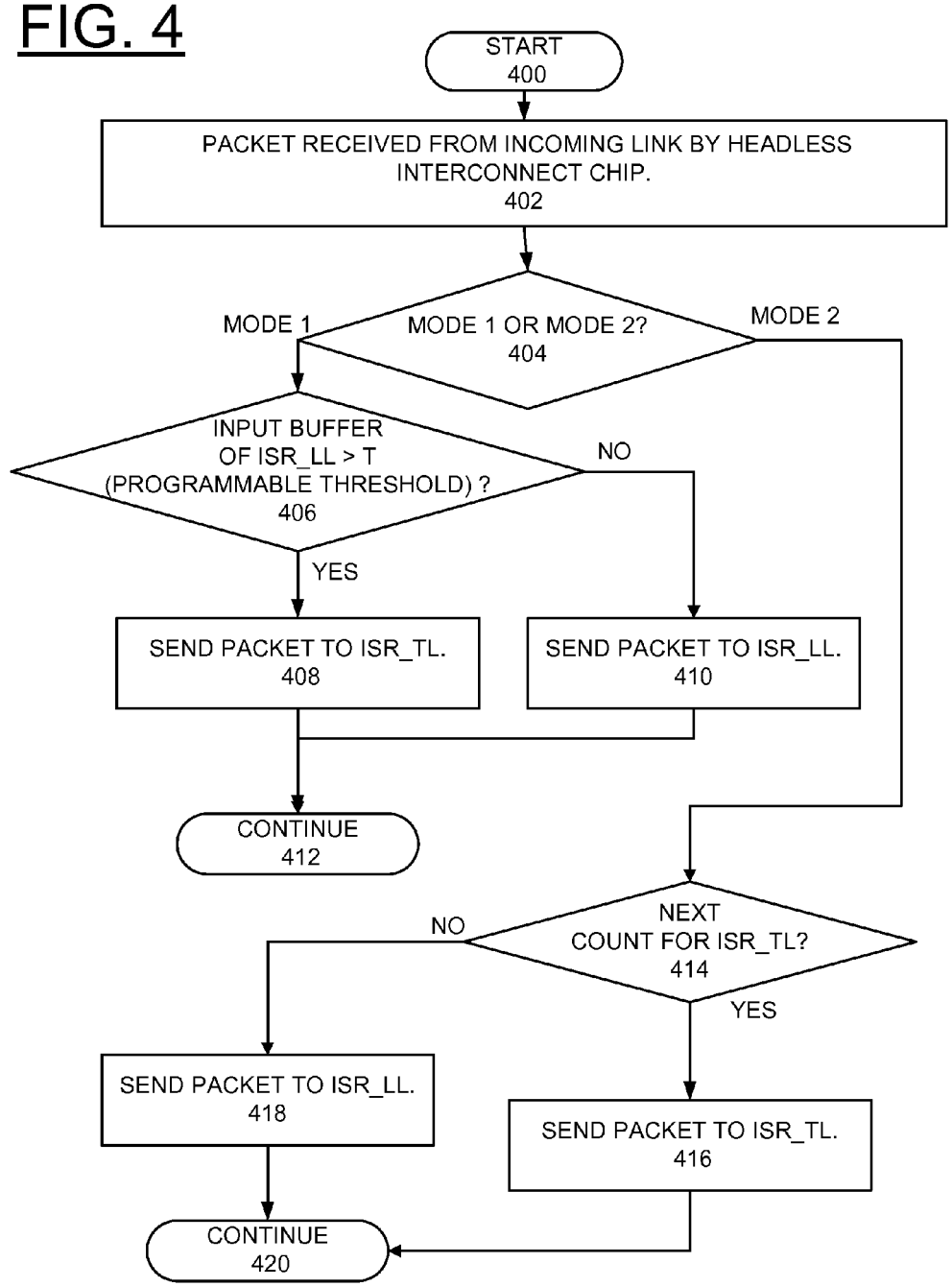

Referring now to FIG. 4, there are shown exemplary operations performed by the circuit 200 for enhanced link bandwidth for the headless interconnect chip 102 in the multiple-path local rack interconnect system 100 in accordance with the preferred embodiment starting at a block 400. A packet is received from an incoming link by a headless interconnect chip 102 as indicated at a block 402. Checking for a selected mode 1 or mode 2 is performed as indicated at a decision block 404.

When mode 1 is identified, then checking is performed to determine whether the input buffer of the cut through ISR_LL switch 208 is greater than a programmable threshold T as indicated at a block 406. The first mode sends the packet to the store and forward ISR_TL switch 206 when the input buffer in the cut through ISR_LL switch 208 is above a programmable threshold as indicated at a block 408. Otherwise, the packet is sent to the cut through ISR_LL switch 208 when the input buffer in the cut through ISR_LL switch 208 is below or equal to a programmable threshold as indicated at a block 410. Then the sequential operations continue as indicated at a block 412.

When mode 2 is identified, as indicated at a decision block 414 then checking is performed to determine whether a next count for a programmable percentage that indicates sending the packet to the store and forward ISR_TL switch 206. The second mode sends the packet to the store and forward ISR_TL switch 206 when the next count for a programmable percentage indicates sending the packet to the store and forward ISR_TL switch 206 as indicated at a block 416. The second mode sends a selected percentage of the incoming link packets or a first number X out of a second number Y of incoming packets to the store and forward ISR_TL switch 206. Otherwise, the packet is sent to the cut through ISR_LL switch 208 when next count for a programmable percentage does not indicate sending the packet to the store and forward ISR_TL switch 206 as indicated at a block 418. Then the sequential operations continue as indicated at a block 420.

Figure 5:
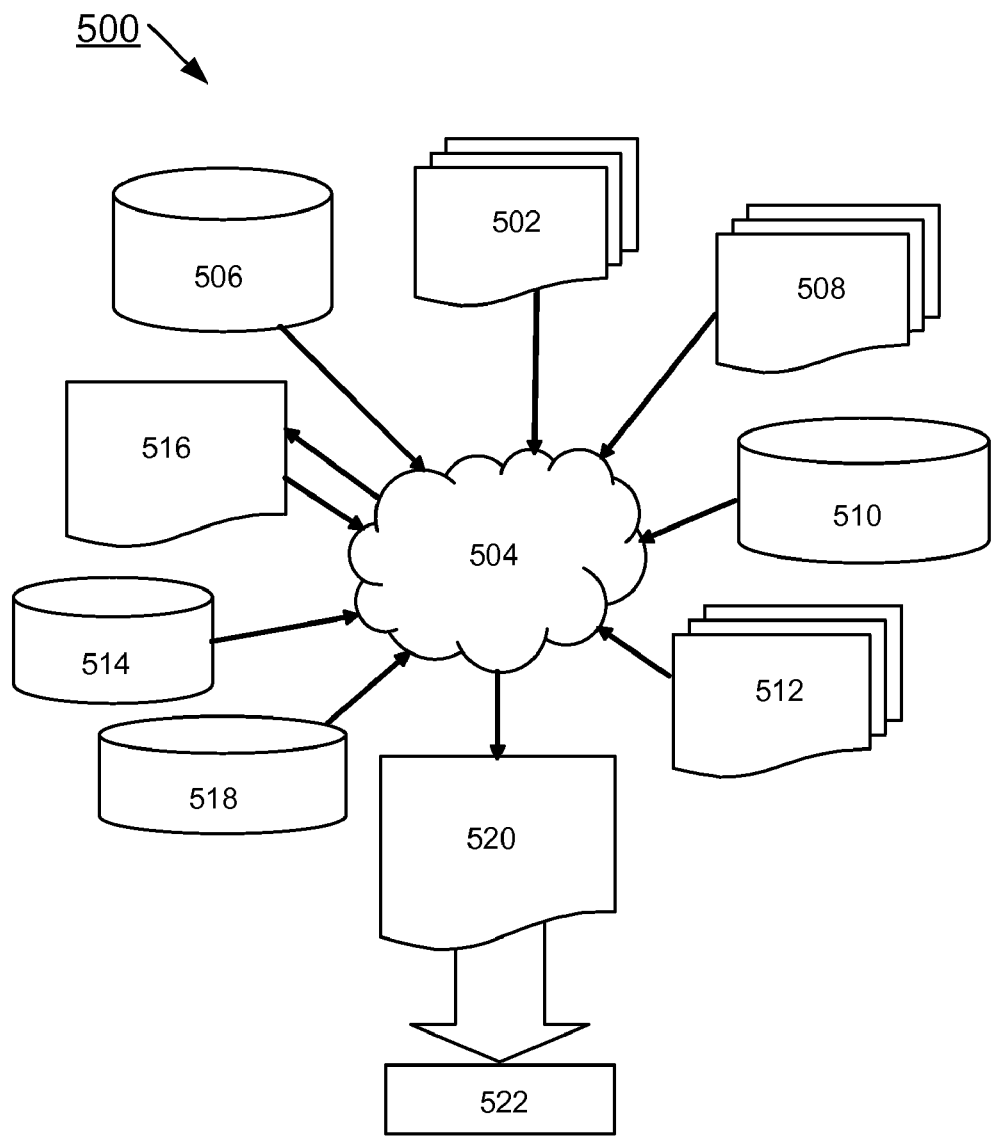
FIG. 5 is a flow diagram of a design process used in semiconductor design, manufacturing, and/or test.

FIG. 5 shows a block diagram of an example design flow 500 that may be used for the enhanced link bandwidth circuit and the interconnect chip described herein. Design flow 500 may vary depending on the type of IC being designed. For example, a design flow 500 for building an application specific IC (ASIC) may differ from a design flow 500 for designing a standard component. Design structure 502 is preferably an input to a design process 504 and may come from an IP provider, a core developer, or other design company or may be generated by the operator of the design flow, or from other sources. Design structure 502 comprises circuits 102, 200 in the form of schematics or HDL, a hardware-description language, for example, Verilog, VHDL, C, and the like. Design structure 502 may be contained on one or more machine readable medium. For example, design structure 502 may be a text file or a graphical representation of circuits 102, 200. Design process 504 preferably synthesizes, or translates, circuits 102, 200 into a netlist 506, where netlist 506 is, for example, a list of wires, transistors, logic gates, control circuits, I/O, models, etc. that describes the connections to other elements and circuits in an integrated circuit design and recorded on at least one of machine readable medium. This may be an iterative process in which netlist 506 is resynthesized one or more times depending on design specifications and parameters for the circuits.

Design process 504 may include using a variety of inputs; for example, inputs from library elements 508 which may house a set of commonly used elements, circuits, and devices, including models, layouts, and symbolic representations, for a given manufacturing technology, such as different technology nodes, 32 nm, 45 nm, 90 nm, and the like, design specifications 510, characterization data 512, verification data 514, design rules 516, and test data files 518, which may include test patterns and other testing information. Design process 504 may further include, for example, standard circuit design processes such as timing analysis, verification, design rule checking, place and route operations, and the like. One of ordinary skill in the art of integrated circuit design can appreciate the extent of possible electronic design automation tools and applications used in design process 504 without deviating from the scope and spirit of the invention. The design structure of the invention is not limited to any specific design flow.

Design process 504 preferably translates an embodiment of the invention as shown in FIGS. 1A-1E, 2, 3, and 4 along with any additional integrated circuit design or data (if applicable), into a second design structure 520. Design structure 520 resides on a storage medium in a data format used for the exchange of layout data of integrated circuits, for example, information stored in a GDSII (GDS2), GL1, OASIS, or any other suitable format for storing such design structures. Design structure 520 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 1A-1E, 2, 3, and 4. Design structure 520 may then proceed to a stage 522 where, for example, design structure 520 proceeds to tape-out, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. A method for implementing enhanced link bandwidth for a headless interconnect chip in an interconnect system, the headless interconnect chip not connected to a source device or a destination device, the interconnect system includes a multiple-path local rack interconnect system used to transfer packets from a source high bandwidth device to a destination high bandwidth device, the interconnect system includes a plurality of interconnect chips, each interconnect chip connected to a plurality of local (L) links and a plurality of distance (D) links and including the headless interconnect chip, said method comprising:
providing the headless interconnect chip with a cut through switch and a store and forward switch, and a switch select logic operating in a threshold mode or a programmable counter mode for selecting the cut through switch or the store and forward switch;
receiving a packet from an incoming link to be transmitted on an outgoing link on the headless interconnect chip;
said switch select logic selectively using the cut through switch and the store and forward switch for moving packets received from the incoming link to the outgoing link on the headless interconnect chip based upon said switch select logic operating in said threshold mode or operating in said programmable counter mode.

2. The method as recited in claim 1 wherein providing a headless interconnect chip with a cut through switch and a store and forward switch includes providing a control enable input to the store and forward switch for enabling link-to-link switching.

3. The method as recited in claim 1 wherein receiving a packet from the incoming link to be transmitted on the outgoing link on the headless interconnect chip includes said switch select logic making a decision whether the packet should be sent to the cut through switch or to the store and forward switch.

4. The method as recited in claim 3 wherein said decision by said switch select logic is based upon a selected one of said switch select logic operating in said threshold mode or operating in said programmable counter mode, said threshold mode includes checking whether an input buffer in the cut through switch is above a programmable threshold; and said programmable counter mode includes checking for a selected percentage of the incoming link packets to send the store and forward switch.

5. The method as recited in claim 1 wherein receiving a packet from the incoming link to be transmitted on the outgoing link on the headless interconnect chip includes said switch select logic operating in said threshold mode sending the packet to the store and forward switch when an input buffer in the cut through switch is above a programmable threshold.

6. The method as recited in claim 1 wherein receiving a packet from the incoming link to be transmitted on the outgoing link on the headless interconnect chip includes said switch select logic operating in said programmable counter mode sending the packet to the store and forward switch when a next count of a selected percentage of the incoming link packets indicates sending the packet to the store and forward switch.

7. A circuit for implementing enhanced link bandwidth for a headless interconnect chip in an interconnect system, the headless interconnect chip not connected to a source device or a destination device; the interconnect system includes a multiple-path local rack interconnect system used to transfer packets from a source high bandwidth device to a destination high bandwidth device, the interconnect system includes a plurality of interconnect chips, each interconnect chip connected to a plurality of local (L) links and a plurality of distance (D) links and including the headless interconnect chip; said circuit comprising:
a headless interconnect chip including a cut through switch and a store and forward switch, and a switch select logic operating in a threshold mode or a programmable counter mode for selecting the cut through switch or the store and forward switch;
a plurality of the L links and a plurality of the D links connected to said headless interconnect chip;
said headless interconnect chip receiving a packet from an incoming link to be transmitted on an outgoing link;
said switch select logic of said headless interconnect chip selectively using the cut through switch and the store and forward switch for moving packets received from the incoming link to the outgoing link on the headless interconnect chip based upon said switch select logic operating in said threshold mode or operating in said programmable counter mode.

8. The circuit as recited in claim 7 wherein said headless interconnect chip includes a control enable input to the store and forward switch for enabling link-to-link switching.

9. The circuit as recited in claim 7 wherein said switch select logic of said headless interconnect chip includes decision logic making a decision whether a received packet should be sent to the cut through switch or to the store and forward switch based upon said switch select logic operating in said threshold mode or operating in said programmable counter mode.

10. The circuit as recited in claim 9 wherein said decision logic with said switch select logic operating in said threshold mode includes logic for checking whether an input buffer in the cut through switch is above a programmable threshold to send the packet to the store and forward switch.

11. The circuit as recited in claim 9 wherein said decision logic with said switch select logic operating in said programmable counter mode includes logic for checking for a selected percentage of the incoming link packets to send the packet to the store and forward switch.

12. A multiple-path local rack interconnect system comprising:
 a plurality of interconnect chips including a source interconnect chip coupled to a source device, a destination interconnect chip coupled to the destination device, and a headless interconnect chip, said headless interconnect chip being an intermediate interconnect chip and said headless interconnect chip not connected to a source device or a destination device;
 a plurality of serial links connected between each of said plurality of interconnect chips;
 each of said interconnect chips including a cut through switch and a store and forward switch, and said headless interconnect chip including a switch select logic operating in a threshold mode or a programmable counter mode for selecting the cut through switch or the store and forward switch;
 said headless interconnect chip receiving a packet from an incoming link to be transmitted on an outgoing link;
 said switch select logic of said headless interconnect chip selectively using the cut through switch and the store and forward switch for moving packets received from the incoming link to the outgoing link on the headless interconnect chip based upon said switch select logic operating in said threshold mode or operating in said programmable counter mode.

13. The multiple-path local rack interconnect system as recited in claim 12 wherein said headless interconnect chip includes a control enable input to the store and forward switch for enabling link-to-link switching.

14. The multiple-path local rack interconnect system as recited in claim 12 wherein said switch select logic of said headless interconnect chip includes decision logic making a decision whether a received packet should be sent to the cut through switch or to the store and forward switch based upon said switch select logic operating in said threshold mode or operating in said programmable counter mode.

15. The multiple-path local rack interconnect system as recited in claim 12 wherein said switch select logic of said headless interconnect chip includes decision logic sending the packet to the store and forward switch when an input buffer in the cut through switch is above a programmable threshold based upon said switch select logic operating in said threshold mode.

16. The multiple-path local rack interconnect system as recited in claim 12 wherein said switch select logic of said headless interconnect chip includes decision logic sending the packet to the store and forward switch when a next count of a selected percentage of the incoming link packets indicates sending the packet to the store and forward switch upon said switch select logic operating in said programmable counter mode.

17. A design structure embodied in a non-transitory machine readable medium used in a design process, the design structure comprising:
 a circuit tangibly embodied in the non-transitory machine readable medium used in the design process, said circuit for implementing enhanced link bandwidth for a headless interconnect chip in an interconnect system, said headless interconnect chip not connected to a source device or a destination device; the interconnect system includes a multiple-path local rack interconnect system used to transfer packets from a source high bandwidth device to a destination high bandwidth device, the interconnect system includes a plurality of interconnect chips, each interconnect chip connected to a plurality of local (L) links and a plurality of distance (D) links and including the headless interconnect chip; said circuit comprising:
 a headless interconnect chip including a cut through switch and a store and forward switch, and a switch select logic operating in a threshold mode or a programmable counter mode for selecting the cut through switch or the store and forward switch;
 a plurality of the L links and a plurality of the D links connected to said headless interconnect chip;
 said headless interconnect chip receiving a packet from an incoming link to be transmitted on an outgoing link;
 said switch select logic of said headless interconnect chip selectively using the cut through switch and the store and forward switch for moving packets received from the incoming link to the outgoing link on the headless interconnect chip based upon said switch select logic operating in said threshold mode or operating in said programmable counter mode, wherein the design structure, when read and used in the manufacture of a semiconductor chip produces a chip comprising said circuit.

18. The design structure of claim 17, wherein the design structure comprises a netlist, which describes said circuit.

19. The design structure of claim 17, wherein the design structure resides on storage medium as a data format used for the exchange of layout data of integrated circuits.

20. The design structure of claim 17, wherein the design structure includes at least one of test data files, characterization data, verification data, or design specifications.

21. The design structure of claim 17, wherein said headless interconnect chip includes a control enable input to the store and forward switch for enabling link-to-link switching.

22. The design structure of claim 17, wherein said switch select logic of said headless interconnect chip includes decision logic for selecting the store and forward switch or the cut through switch for link-to-link switching of a received packet on an incoming link based upon said switch select logic operating in said threshold mode or operating in said programmable counter mode.

* * * * *